United States Patent [19]

Kobayashi et al.

[11] Patent Number: 5,036,509
[45] Date of Patent: Jul. 30, 1991

[54] GUIDE MECHANISM FOR DISC REPRODUCING APPARATUS

[75] Inventors: Kazuo Kobayashi; Yoshinori Yamada; Kiyoshi Morikawa; Masakazu Kurumada; Masanori Sugihara, all of Saitama, Japan

[73] Assignee: Pioneer Electronic Corporation, Tokyo, Japan

[21] Appl. No.: 492,199

[22] Filed: Mar. 13, 1990

[30] Foreign Application Priority Data

Mar. 13, 1989 [JP] Japan ................................. 1-60540
Mar. 13, 1989 [JP] Japan ................................. 1-60541

[51] Int. Cl.$^5$ ..................... G11B 33/02; G11B 5/016; G11B 17/04
[52] U.S. Cl. ..................... 369/75.2; 369/75.1; 369/77.1; 369/77.2; 360/99.02; 360/99.06
[58] Field of Search ............ 369/75.2, 75.1, 77.1, 369/77.2, 270, 271; 360/99.02, 99.04, 99.06, 99.08, 99.12

[56] References Cited

U.S. PATENT DOCUMENTS

| 4,592,039 | 5/1986 | Toyoguchi et al. | 369/77.1 X |
| 4,607,361 | 8/1986 | Schuitmaker et al. | 369/77.1 X |
| 4,628,498 | 12/1986 | Takamatsu et al. | 369/77.1 |

FOREIGN PATENT DOCUMENTS

| 296829 | 12/1988 | European Pat. Off. |
| 3244524 | 6/1983 | Fed. Rep. of Germany. |
| 3314400 | 11/1983 | Fed. Rep. of Germany. |
| 3517004 | 11/1986 | Fed. Rep. of Germany. |
| 2141862 | 1/1985 | Japan ................................. 369/77.1 |
| 2120831 | 12/1983 | United Kingdom. |
| 2135811 | 9/1984 | United Kingdom. |
| 2218254 | 12/1989 | United Kingdom. |

*Primary Examiner*—Stuart S. Levy
*Assistant Examiner*—Tien Ba Pham
*Attorney, Agent, or Firm*—Sughrue, Mion, Zinn, Macpeak & Seas

[57] ABSTRACT

A disc reproducing apparatus is disclosed in which a disc is delivered from a disc inserting opening to a predetermined position within a player, a clamper arm that extends over a turntable for clamping the disc is operated to fix the disc on the turntable, and then the turntable is rotated to reproduce information recorded in the disc. A disc guide plate is pivotally mounted to the clamper arm such that the disc guide plate engages and disengages the clamper arm. A disc guiding recess into which a small-diameter disc can be fitted is provided to the disc guide plate. When the small-diameter disc is delivered, the small-diameter disc is fitted into the disc guiding recess to be aligned with a clamp position, and when a large-diameter disc is delivered, the large-diameter disc pushes the disc guide plate away to be aligned with the clamp position on the turntable.

3 Claims, 9 Drawing Sheets

GUIDE MECHANISM FOR DISC REPRODUCING APPARATUS

BACKGROUND OF THE INVENTION

The present invention relates to a disc reproducing apparatus in which the disc inserted through the disc inserting opening of a disc player is aligned at its center with the center of the turntable.

Figure 1:
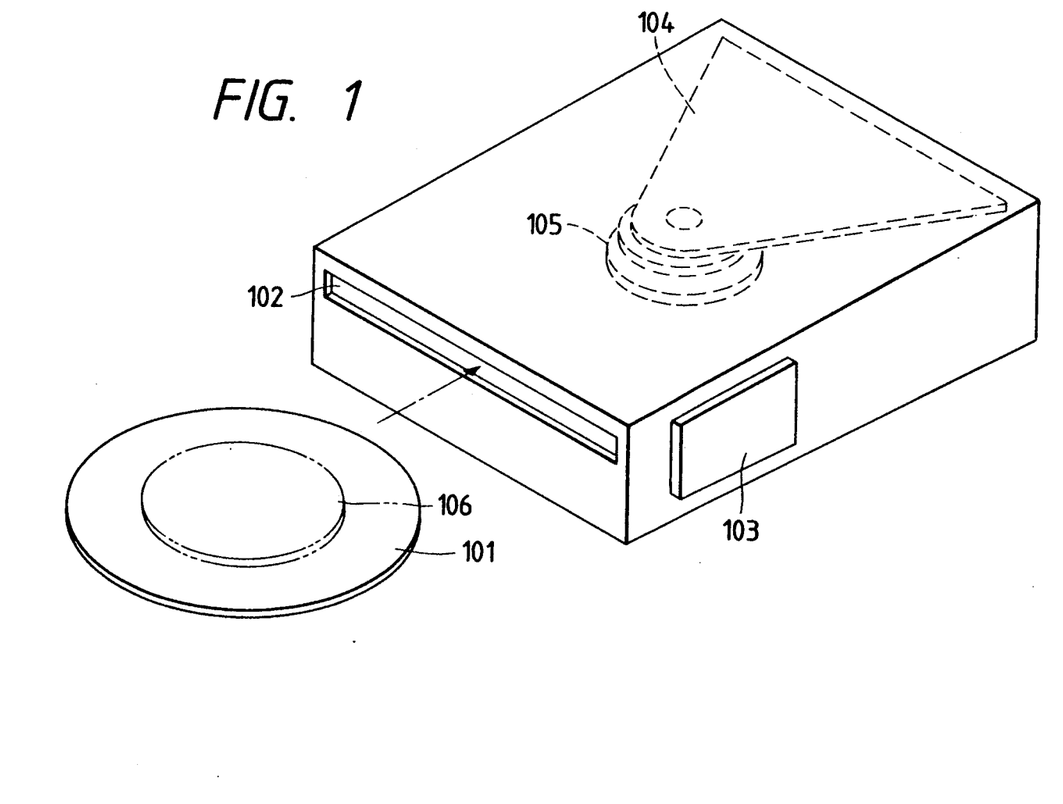
FIG. 1 is a perspective view of a prior art on-vehicle CD player.

Recently, a compact disc has been developed which has a recording layer having pits corresponding to digital signals obtained by converting analog sounds (hereinafter referred merely as "a disc", when applicable). With the disc, analog sounds are optically reproduced by using a laser beam applied by the reading head of a CD (compact disc) player. The disc is much superior both in tone quality and in operability to conventional LP record discs. Hence, the compact disc together with its CD player has quickly come into wide use. Accordingly, CD players to be mounted on vehicles have been developed (hereinafter referred to as "vehicle disc players", when applicable). One example of the vehicle disc players is as shown in FIG. 1. In FIG. 1, reference numeral 101 designates a disc 12 cm in diameter in which pieces of music have been recorded. When the disc 101 is inserted into a disc inserting opening 102, it is conveyed to a predetermined position (which is substantially the center of the CD player) by a loading mechanism 103, where it is fixedly mounted on the turntable 105 by a clamper arm 104. The disc 101 thus mounted is rotated by a spindle motor (not shown), so that the pieces of music are reproduced with a reading head (not shown).

On the other hand, a disc 106 of 8 cm in diameter, which is much smaller in diameter than the disc 101 of 12 cm in diameter, has been proposed in the art.

However, such a prior art CD player is constructed such that when a disc 101 having a diameter of 12 cm is delivered to abut the stopper, the center of the disc is aligned with that of the turntable. Thus, when a disc 106 having a diameter of eight centimeters is to be aligned with the turntable, the center of the disc 106 will have deviated from that of the turntable if the disc is delivered until the disc 106 abuts the stopper. Therefore, the disc 106 having an eight centimeters diameter will not be placed properly on the turntable resulting the problem that the music cannot be reproduced by means of a reading head.

SUMMARY OF THE INVENTION

An object of the present invention, in view of the aforementioned drawbacks, is to provide a disc reproducing apparatus capable of properly positioning the disc on a predetermined position on the turntable when the small-diameter disc is inserted through the disc inserting opening.

According to the invention, there is provided a disc reproducing apparatus in which a disc is delivered from a disc inserting opening to a predetermined position within a player, a clamper arm that extends over a turntable for clamping the disc is operated to fix the disc on the turntable, and then turntable is rotated to reproduce information recorded in the disc, wherein a disc guide plate is pivotally mounted to the clamper arm such that the disc guide plate engages and disengages the clamper arm; a disc guiding recess into which a small-diameter disc can be fitted is provided to the disc guide plate; and when the small-diameter disc is delivered, the small-diameter disc is fitted into said disc guiding recess to be aligned with a clamp position, when a large-diameter disc is delivered, the large-diameter disc pushes the disc guide plate away to be aligned with the clamp position on the turntable.

A disc guide plate having a disc guiding recess is pivotally mounted to a clamper arm. When a disc of a small-diameter is inserted through a disc inserting opening and is guided onto the turntable, the disc is guided by the disc guiding recess. Whereas when the disc having a large diameter is delivered toward the turntable, the disc pushes the disc guide plate to abut the stopper, thereby being positioned at the clamp position on the turntable.

According to another aspect of the invention, there is provided a disc reproducing apparatus in which a disc is inserted through the disc inserting opening to abut a drive roller and is then delivered by means of the drive roller to a clamp position of a player, a clamper arm extending over the turntable is operated to fix the disc on the turntable, and the turntable is rotated to reproduce information recorded in the disc, wherein a disc guide plate for guiding a small-diameter disc to the clamp position on the turntable is pivotally mounted on the underside of the clamper arm; a guide member is opposed to the drive roller, the guide member cooperating with the drive roller to guide and deliver the disc; a parallel guide surface is formed on said guide member, the surface being substantially parallel to the disc delivery direction; and an inclined groove is formed continuously integral with the parallel guide surface, the inclined groove having a length through which said small-diameter disc can pass in the disc inserting direction but a large disc cannot, the inclined groove causing the small-diameter disc to orient to the disc guide plate.

An on-vehicle disc reproducing apparatus is subjected to vibration while the vehicle is running and therefore the disc guide plate mounted to the clamper arm also undergoes vibration. The disc of a small diameter is advanced in a horizontal direction along the parallel guide surface of the guide member and drops in an inclined groove to subsequently be carried toward the disc guide plate mounted to the clamper arm. Therefore, even if the disc guide plate undergoes vibration, the inserted disc having a small diameter is arrested by the disc-guiding recess to the clamp position.

On the other hand, when a disc of a large diameter is inserted into the disc inserting opening, the disc is guided in the horizontal direction by both the guide member and the drive roller to be carried in the horizontal direction along the parallel guide surface without dropping in the inclined groove, and then pushes the disc guide plate to sit in a clamp position.

DESCRIPTION OF THE PREFERRED EMBODIMENTS

One embodiment of this invention will be described with reference to the accompanying drawings. FIGS. 2 through 9 show one example of a vehicle CD player according to the invention.

Figure 2:
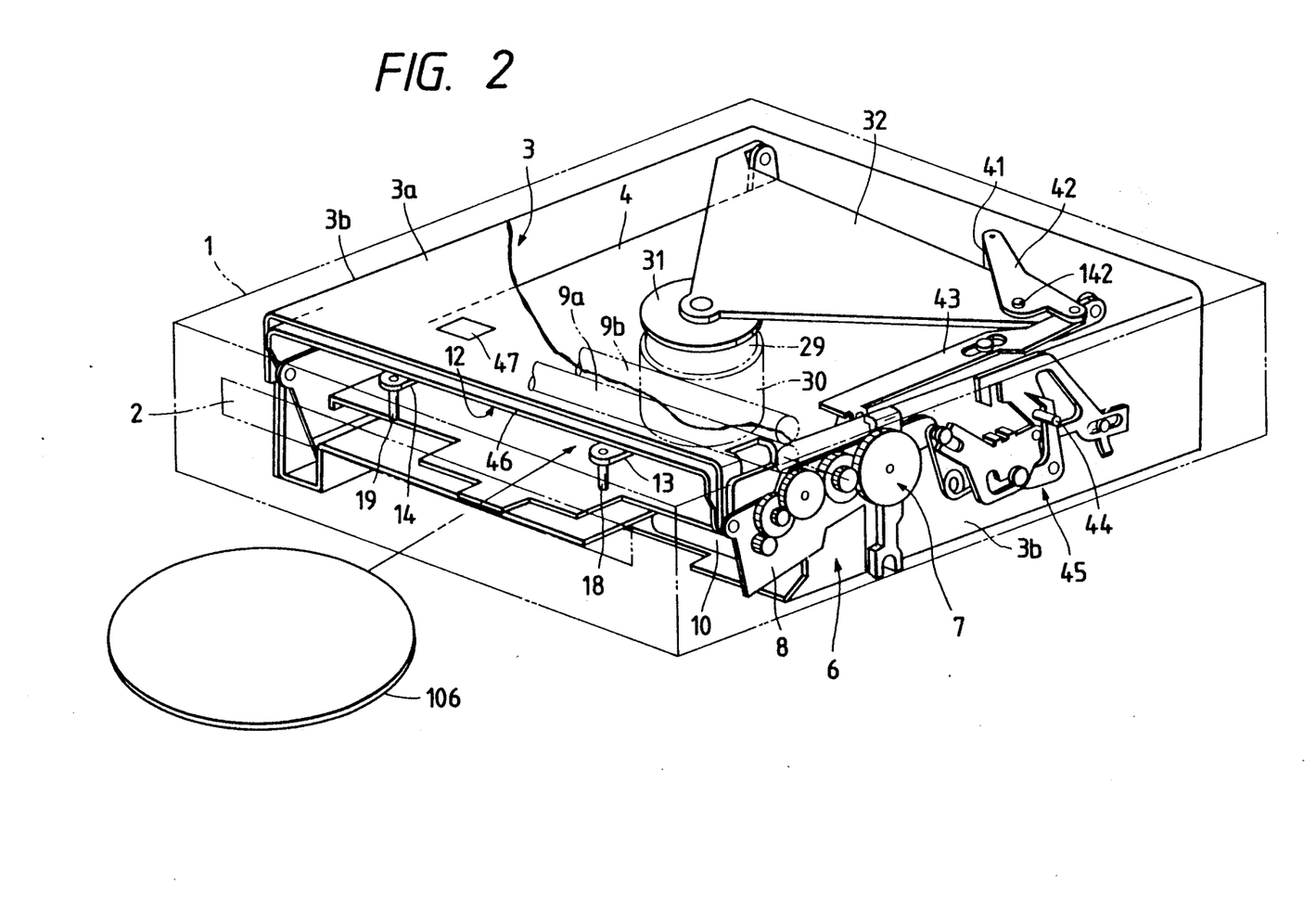
FIG. 2 is a perspective view of a CD player according to the present invention.
Figure 3:
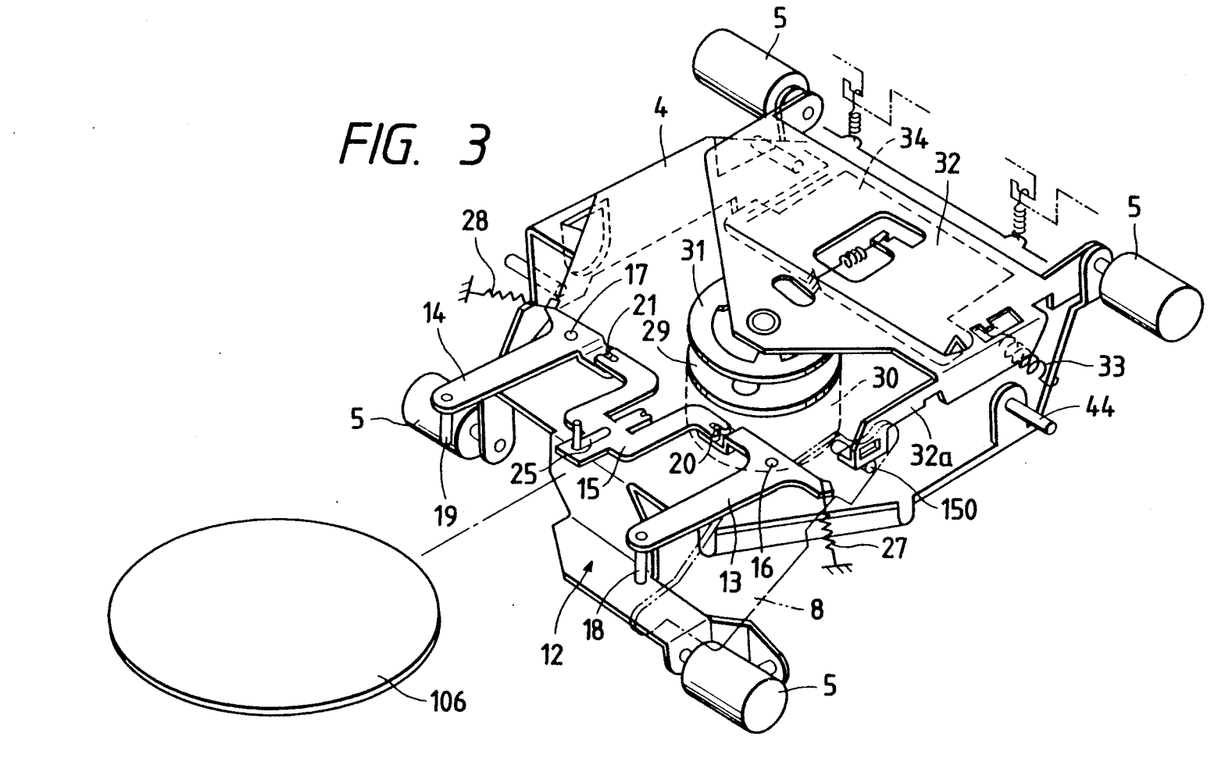
FIG. 3 is a perspective view of a supporting frame on which a centering mechanism is disposed.

In FIG. 2, reference numeral 1 designates the casing of the vehicle CD player according to the invention. A disc inserting opening 2 is formed in the front wall of the casing 1. A frame 3 is provided in the casing 1. The frame 3 is made up of a top plate 3a which is substantially in the form of a flat plate, and side plates 3b and 3b extended downwardly from both ends of the top plate 3a. A supporting frame 4 as shown in FIG. 3 is provided inside the frame 3. A reproducing means for reproducing music recorded in discs is mounted on the supporting frame 4 substantially at the center. The supporting frame 4 is supported through dampers 5 by the frame 3 in floating manner. A loading mechanism 6 and a loading arm lowering mechanism 7, which are used to move a disc 101 inserted into the disc inserting opening 2 to a predetermined position (substantially the center of the supporting frame 4) are provided through a loading arm 8 on one side of the front end portion of the frame 3. The loading mechanism 6 has a driving roller 9a which is supported by the supporting frame 4. The detailed explanation of loading mechanism 6 and the loading arm lowering mechanism 7, and a lock mechanism 45 (described later) have been described in the specification of Japanese Utility Patent Application No. 136632/1987 in detail. A loading motor 10 is provided in the frame 3 at the front end portion to rotate the driving roller 9a. The driving roller 9a thus rotated delivers the disc 106 inserted into the disc inserting opening 2 to the predetermined position in cooperation with a driven roller 9b engaged with the driving roller 9a.

A centering mechanism 12 (FIG. 3) for positioning the disc 106 at the middle of the disc inserting opening 2 is provided inside the frame 3 and near the disc inserting opening 2. The centering mechanism 12, as shown in FIG. 4, comprises: a pair of centering arms 13 and 14; and a centering lever 15 interposed between with the centering arms 13 and 14.

Each of the centering arms 13 and 14 is substantially L-shaped. Each of the centering arms 13 and 14 is pivotally supported about a support pin 16, 17 provided at a center portion between the tip end portion extends close to the disc inserting opening 2. Centering pins 18 and 19 are provided at the tip end portions in order to contact with circumferential edges of the disc.

The centering lever 15 is substantially inverted W-shaped, and has coupling grooves 22 and 23 at both ends. The coupling grooves 22 and 23 are engaged with the coupling pins 20 and 21, respectively, so that the two centering arms 13 and 14 are coupled to the right and left ends of the centering lever 15. The centering lever 15 has a hole 25 which is elongated along the disc inserting direction. The elongated hole 25, as indicated at 25a in FIG. 5, is circular at the end closer to the disc inserting opening 2 (hereinafter referred to as "a circular head hole 25a"when applicable). A guide pin 26 embedded in the frame 3 is loosely fitted in the elongated hole 25 so that it is movable along the elongated hole 25. The middle portion 15c of the centering lever 15 has a guide groove 125 at the other end portion. The guide groove 125 is engaged with a guide pin 126 fixedly embedded in the frame top plate 3a.

Figure 4:
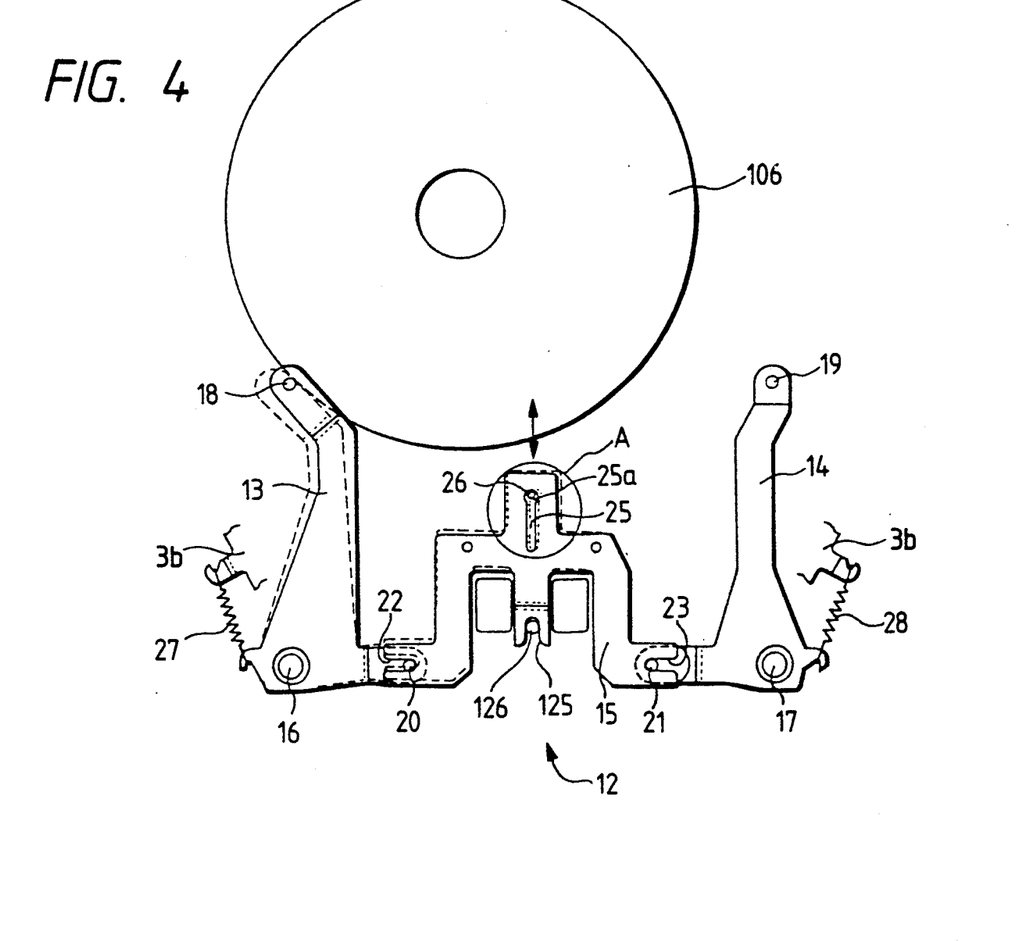
FIG. 4 is a top view of the centering mechanism.
Figure 5:
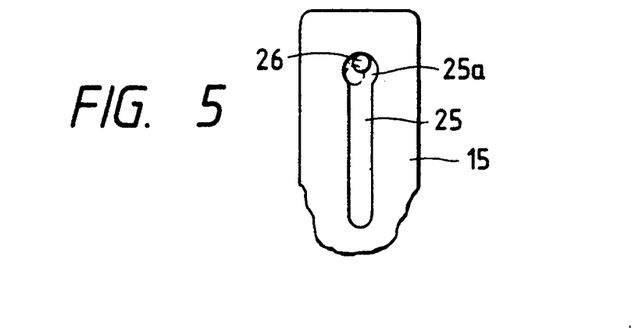
FIG. 5 is a fragmentary enlarged view of A in FIG. 4.

Tension springs 27 and 28 are connected between the centering arm 13 and 14 and protrusions 3b and 3b of the frame 3, respectively, to urge the centering pins 18 and 19 to approach each other (see FIG. 4). The distance between the centering pins 18 and 19 is set at about 8 cm under the free condition.

It is assumed that the small diameter disc 106 is inserted into the disc inserting opening 2 in such a manner that it is shifted sidewards from the middle of the opening 2. In this case, the disc is brought into contact with one of the centering pins 18 and 19. When the disc 106 is brought into contact with the centering pin 18 as shown in FIG. 4, then the centering arm 13 is slightly turned counterclockwise about the supporting pin 16 against the elastic force of the tension spring 27. As a result, the centering lever 15 is slightly turned clockwise as a whole. As the centering lever 15 is turned in this manner, as shown in FIG. 5 the guide pin 26 is caused to move from the center of the circular head hole 25a to abut against the lower left part (in FIG. 5) of the wall of the circular head hole 25a. Accordingly, the guide pin 26 cannot move in the elongated hole 25 relative to the centering lever; that is, the centering lever 15 cannot move towards the disc inserting opening 2. Therefore, the centering arm 13 is slightly swung by the disc 106, but it is not swung further. Thus, the disc 106 shifted sidewards is caused to position at the middle of the disc inserting opening 2, being regulated by the centering pin 18.

When the disc 101 is positioned at the middle of the disc inserting opening 2, then it is brought into contact with the two centering pins 18 and 19 at the same time. In this case, the centering arms 13 and 14 are turned about the supporting pins 16 and 17, respectively, to move both sides of the centering lever 15 towards the disc inserting opening 2 simultaneously. In this case, the guide pin 26 is not shifted in the widthwise direction of the elongated hole 25; that is, it is movable relative to the centering lever in the elongated hole 25. Therefore, the centering lever 15 is moved towards the disc inserting hole 2. As the centering lever 15 is moved in this manner, the centering arms 13 are further turned, so that the disc 101 can be inserted into the vehicle CD player.

As shown in FIG. 3, a turntable 29, on which a disc 106 is mounted, is provided on the supporting frame 4 substantially at the center. The turntable 29 is rotated by a spindle motor 30 provided below the supporting frame 4. A small disc-shaped clamper 31 is arranged over the turntable 29. More specifically, the clamper 31 is coupled to the triangular end portion of a clamper arm 32 which is rockably connected to the rear end of the supporting frame 4. A tension spring 33 is connected between the clamper arm 32 and the supporting frame 4 to urge the clamper arm 32 towards the turntable 29.

Figure 6:
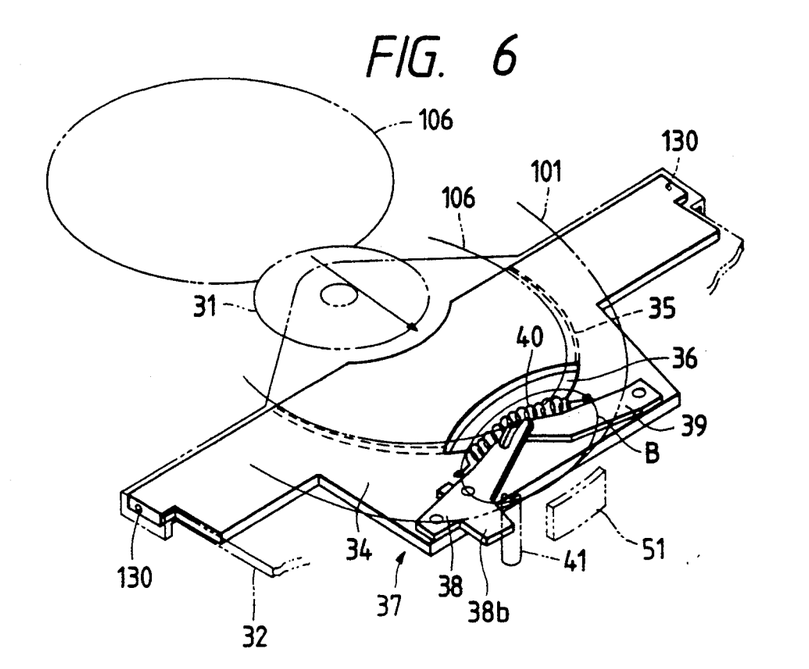
FIG. 6 is a perspective view of a disc guide plate and a depressing assist mechanism.
Figure 7:
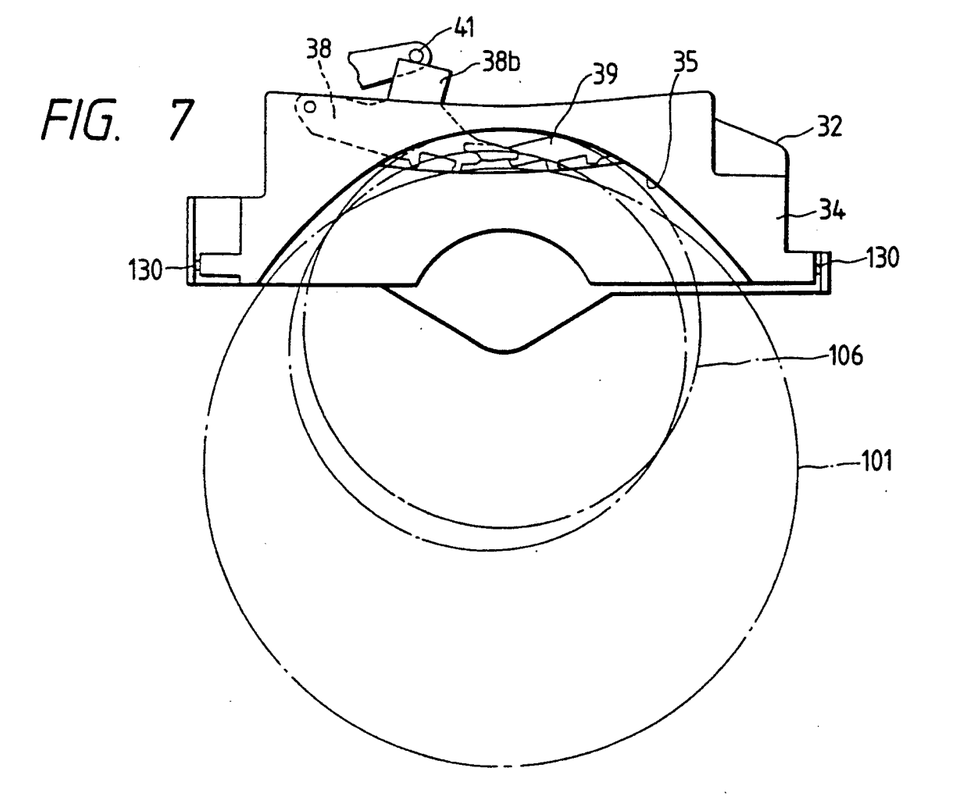
FIG. 7 is a bottom view of the disc guide plate and the depressing assist mechanism.

As shown in FIGS. 6 and 7, a disc guide plate 34 is provided below the clamper arm 32. When the smaller diameter 8 cm disc 106 is moved and positioned above the turntable 29, the disc guide plate 34 operates a detecting pin 41 to mount the disc 106 on the turntable 29. The disc guide plate 34 is swingably coupled to the pivot points 130 and 130 provided at both sides of the front end portion of the clamper arm 32, and is urged downwardly by a leaf spring 140.

Figure 8:
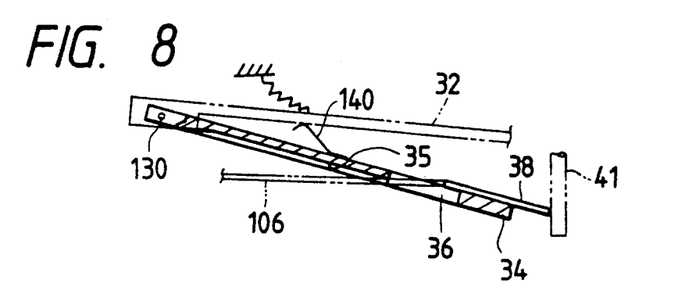
FIGS. 8 and 9 are cross-sectional views of the disc guide plate and the depressing assist mechanism.

In the middle on the underside of the disc guide plate 34 is formed a generally arcuate disc guiding recess 35 configured to a disc of a 8 cm diameter as shown in FIG. 7. The width of the disc guiding recess 35 when the disc is inserted is greater than 8 cm diameter of the small disc 106 but smaller than 12 cm diameter of the large disc 101. Thus, when the small disc 106 is carried to the predetermined position, the disc 106 drops in the disc guiding recess 35. The disc guiding recess 35 is formed with a hole 36 therein at the rear end thereof. The middle portion of the depressing assist mechanism 37, which is mounted to the top side of the disc guide plate 34, is on the other side of the hole 36. As shown in FIG. 8, the disc 106, which has fitted into the disc guiding recess 35, extends through the hole 36 and abuts at the tip end thereof the depressing assist mechanism 37 to cause the depressing assist mechanism 37 to operate.

When the 12 cm diameter disc 101 is transferred onto the turntable 29, the disc 101 does not fit the disc guiding recess 35 because the diameter of the disc 101 is greater than the width of the recess 35, but is carried above the recess 35 pushing away the disc guide plate 34. As a result, the periphery of the disc 101 comes in direct abutment relation with the detecting pin 41 and subsequently comes in abutment relation with the stopper 51 (FIG. 6) provided to the supporting frame 4.

Figure 10:
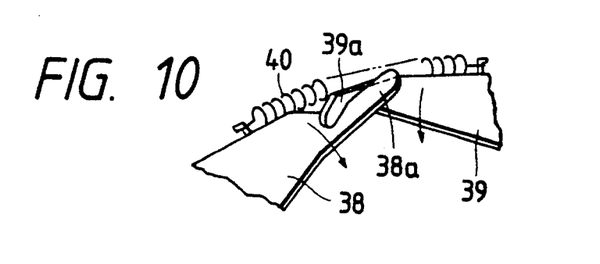
FIG. 10 is an expanded view of B in FIG. 6.

The depressing assist mechanism 37 has a pair of swing arms 38 and 39 the base portion of which is pivotally mounted to the disc guide plate 34. Between the pair of swing arms 38 and 39 is mounted a tension spring 40 such that the tip ends 38a and 39a of the arms engage each other in shake-hand relation as shown in FIG. 10. When the tip ends 38a and 39a are pushed through the hole 36 by the front end of the small-diameter disc 106, the pair of arms 38 and 39 pivot just as a door opens. A projecting strip 38b is continuously integral with the swing arm 38 and a detecting pin 41 is provided at a location where the projecting strip 38b opposes the detecting pin 41. The pivotal movement of the swing arm 38 causes the projecting strip 38b to depress the detecting pin 41.

Figure 11:
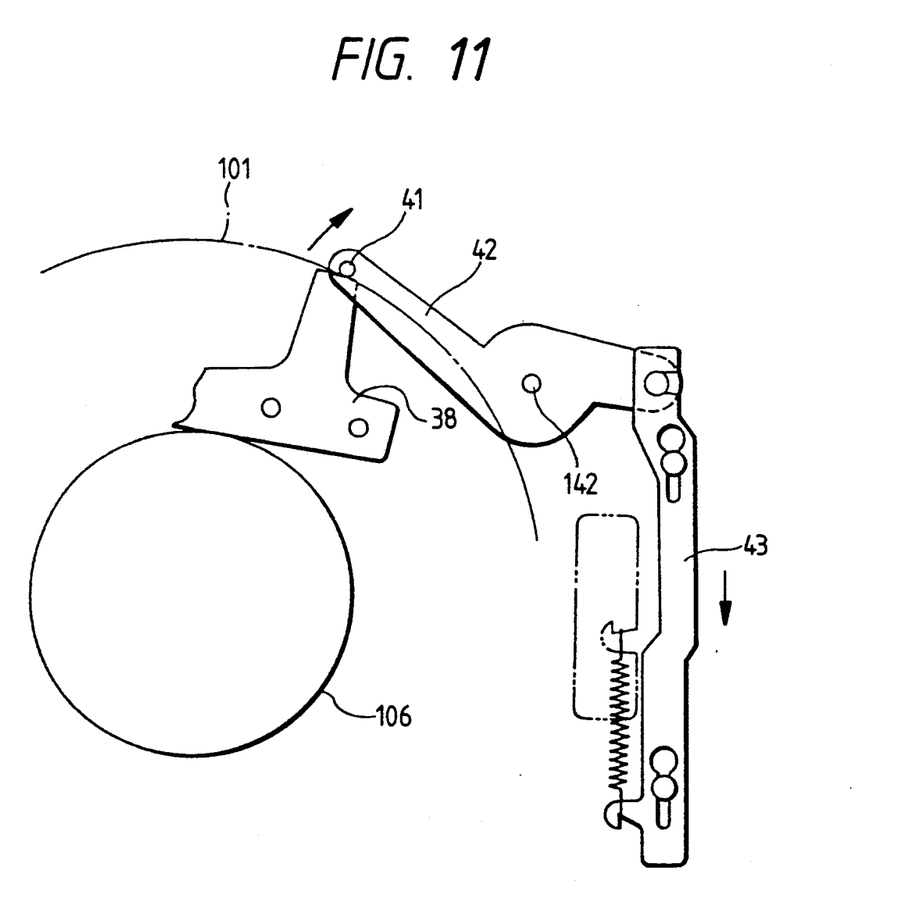
FIG. 11 is a top view, showing a link mechanism.

As shown in FIG. 11, the detecting pin 41 is mounted to one end of a first link 42 that forms part of a link mechanism pivotally mounted at the rear end of the frame 3. The other end of the first link 42 is connected to a second link 43 disposed, slidable in the disc insertion direction. The detecting pin 41 is pushed by the arm 38 if the disc is the small disc 106, and is pushed directly by the disc if the disc is the large disc 101. When the detecting pin is pushed by the disc, the second link 43 is caused to slide to allow the loading arm pivoting mechanism 7 to operate, thereby lowering the loading arm 8.

As shown in FIGS. 2 and 3, a lock pin 44 is provided on the side wall of the supporting frame 4 and projects from the side wall thereof. A lock mechanism 45 is provided on the side wall from which the lock pin 44 projects. The lock pin 44 is locked by the lock mechanism 45 until the inserted disc is transferred to the predetermined position; therefore the supporting frame 4 is fixed to the frame 3. When the loading arm 8 is moved downwardly by the loading-arm pivoting mechanism 7, the lock mechanism 45 releases the lock pin 44, causing the supporting frame 4 to be supported with shock absorbing effect on the frame 3 by means of a damper 5.

A movable lid 46 adapted to open and close, is attached to the frame 3 near the disc inserting opening 2. The movable lid 46 moves to the disc inserting opening 2 while the on-vehicle CD player is in use, thereby preventing other discs from being accidentally inserted.

The operation of the disc reproducing apparatus will be described.

When the disc 106 of a small diameter is inserted into the disc inserting opening 2, a sensor 47 mounted to the front of a ceiling 3a detects the insertion of the disc 106 to cause a loading motor 10 to operate. At this time, if the disc 106 deviates from the center of the disc insertion opening 2 when it is inserted into the disc insertion opening 2, the disc abuts one of a pair of centering pins 18 and 19 and is positioned, as mentioned previously, in the middle of the disc insertion opening 2 by the centering mechanism 12.

Then, loading motor 10 drives a drive roller 9a into rotation. The drive roller in turn cooperates with a driven roller 9b to transfer the inserted disc 106 to the turntable 29. When the disc 106 arrives at the middle of the turntable 29, the disc 106 abuts the underside of the disc guide plate 34 as shown in FIG. 7. Since the disc 106 is eight centimeters in diameter, it is delivered along the underside of the disc guide plate 34 and then fits into the disc guiding recess 35. When the disc 106 goes into the disc guiding recess 35, the front end of the disc 106 depresses the detecting pin 41 through the depressing assist mechanism 37 which is located on the other side of the hole 36, as shown in FIG. 8. In other words, the disc 106 causes the swing arm 38 to pivot, which in turn causes the projecting strip 38b to depress the detecting pin 41.

Figure 9:
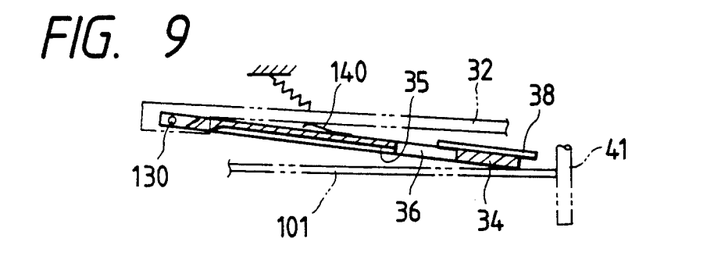

The 12 cm diameter disc 101 which is inserted into the disc insertion opening 2 is transferred to the turntable 29 just as in the case of the small-diameter disc to thereby abut the underside of the disc guide plate 34. Since the disc 101 is 12 centimeters in diameter, it does not fit into the disc guiding recess 35 of a width narrower than the diameter of the disc 101, but is delivered over the disc guiding recess 35 and depresses the disc guide plate 34. The disc 101 depresses the disc guide plate 34 against the urging force of a leaf spring 140 as shown in FIG. 9 and further repels the disc guide plate 34 for causing the disc guide plate 34 to swing about a pivot point 130 to directly push the detecting pin 41. In this manner, the disc guide plate 34 having the disc guiding recess 35 is pivotally mounted to the clamper arm 32. Thus, when the small-diameter disc 106 is transferred to the turntable 29, the disc 106 fits into the disc guiding recess 35 to stop at the front end of the recess which is the clamp position where the center of the small-diameter disc 106 is in alignment relation with the center of the spindle. On the other hand, when the large disc 101 is delivered to the turntable 29, the disc 101 pushes the disc guide plate 34 to abut the stopper 51. The position where the disc 101 abuts the stopper 51 is the clamp position.

When the detecting pin 41 is pushed, the first link 42 pivots about the pin 142 as shown in FIG. 11 and causes the second link 43 to slide to release a pin (not shown) mounted to the loading arm pivoting mechanism 7 for the activation of the loading arm 8. Thus, as shown in FIG. 3, as the laterally-projecting strip 32a descends together with loading arm 8 with which the strip 32a is in contact, the clamper arm 32 descends with the aid of the biasing force of the tension spring 33 to thereby depress and fix the disc 106 placed on the turntable 29 by means of the clamper 31. The disc reproducing apparatus is in a floating condition when the disc 106 is fixed by the clamper 31, the lock mechanism 45 drivingly cooperates with the loading arm pivoting mechanism 7 to release the lock pin 44, and the supporting frame 4 is supported with shock absorbing effect on the frame 3 with the aid of the damper. In this manner, the apparatus becomes ready for reproducing, and the spindle motor 30 is operated to drive the turntable 29 thus the disc 106 into rotation. When the disc 106 is rotated, a reading head (not shown) emits a laser light to reproduce the music recorded in the disc while moving radially of the disc 106.

As mentioned above, according to the present invention, a disc guide plate is pivotally mounted to the clamper arm, and the disc guide plate is provided with a disc guiding recess for receiving a small-diameter disc in fitted relation. When the small-diameter disc is delivered, it is received in the disc guiding recess to be positioned at a clamp position on the turntable, whereas when a large-diameter disc is delivered, the large disc pushes the disc guide plate to sit at a clamp position on the turntable. Thus, without regard to the size of the disc, small-diameter disc or the large-diameter disc, they can reliably be positioned at the clamp position on the turntable.

Another embodiment of the invention will now be described with reference to FIGS. 12 to 14 in which the same reference numerals are used to denote the like members.

Figure 12:
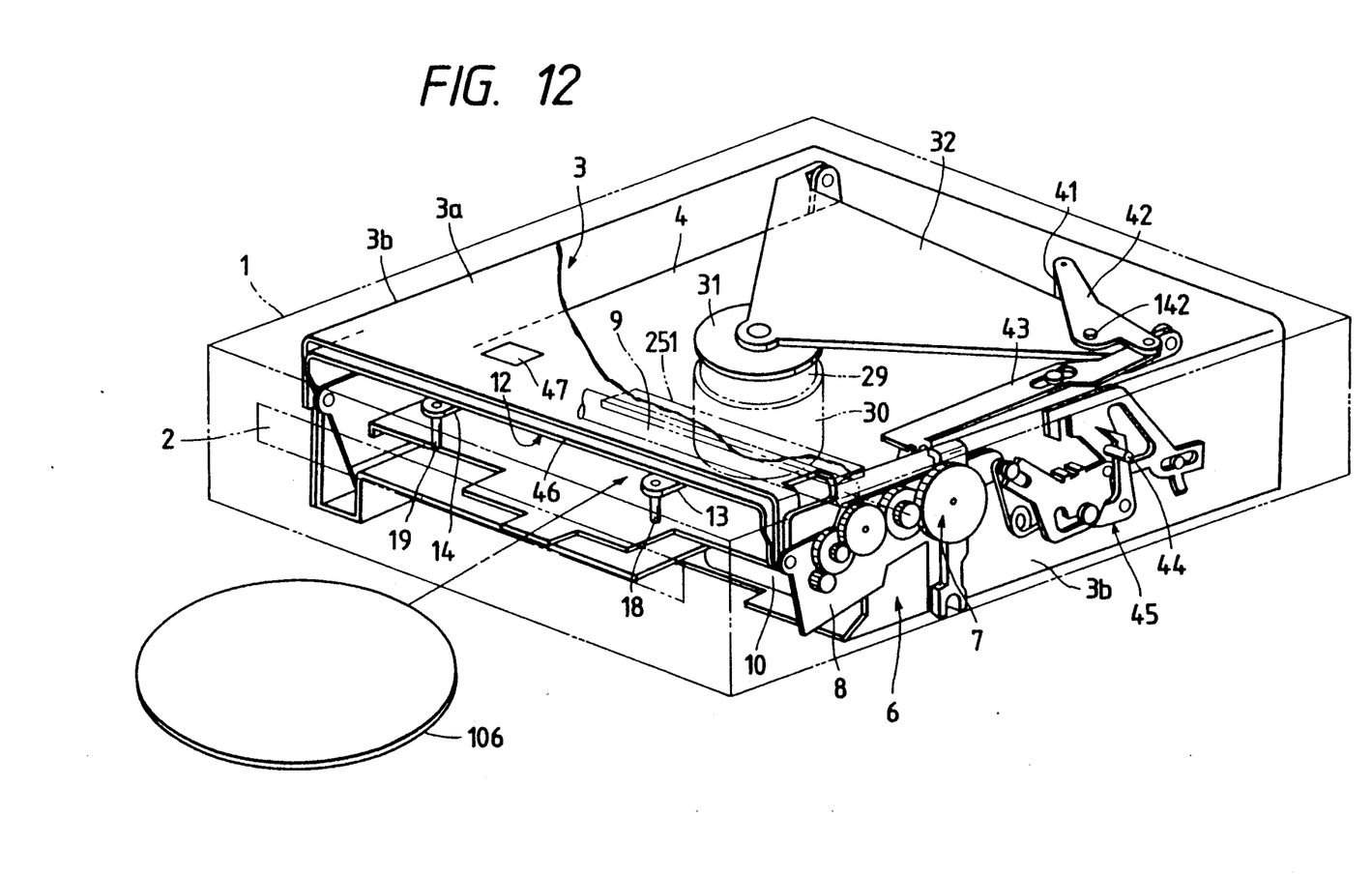
FIGS. 12 to 14 show another embodiment of the invention.
Figure 13:
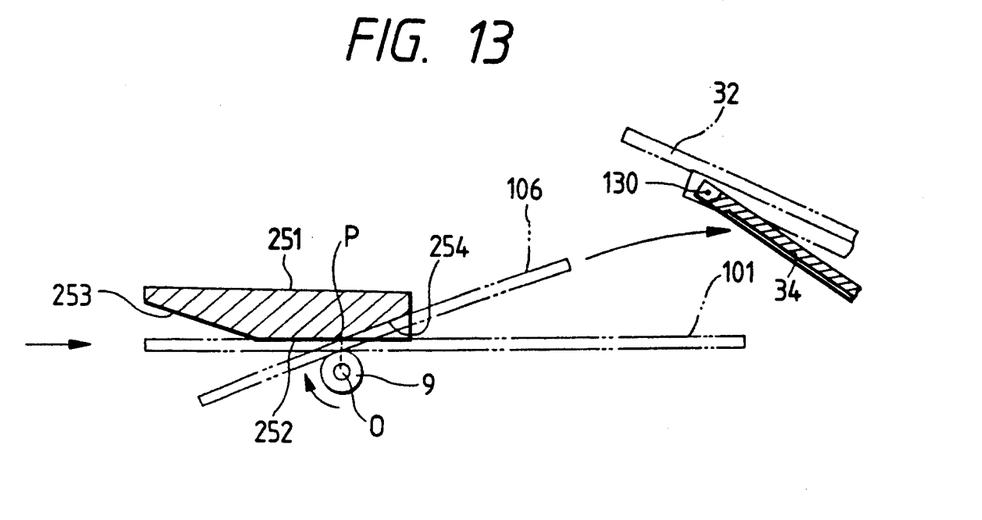
Figure 14:
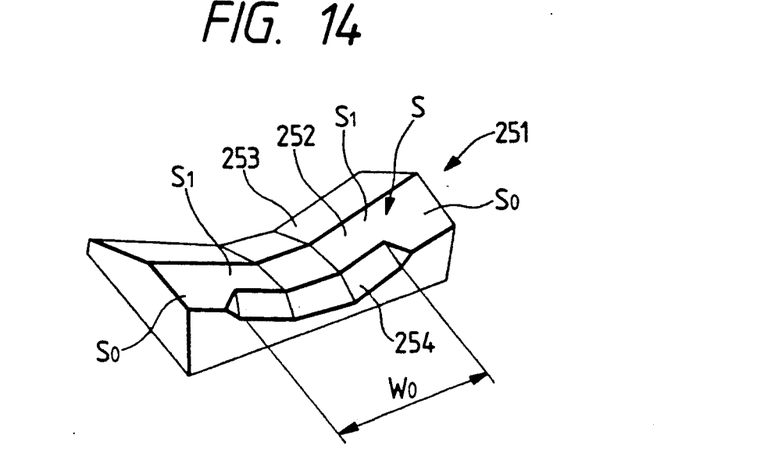

As shown in FIG. 12 and FIG. 13, a guide member 251 is disposed above a drive roller 9 and cooperates with the drive roller 9 for grasping the disc 101 or 106 to guide the disc. The guide member 251 provides a generally recessed guide surface S. Each end So and So engages the circumference of the large-diameter disc 101 in abutment relation to carry the disc. Surfaces S1 and S2 which are further inward than each end So and So engage the circumference of the small-diameter disc 106. The guide member 251 is made of, for example, synthetic resin. As shown in FIG. 14, on the underside of the guide member 251 is formed a parallel guide surface 252, which extends in the widthwise direction of the disc inserting opening 2 and is substantially parallel to the direction in which the disc is carried. There are provided an inclined surface 253 which extends from the parallel guide surface 252 toward the rear end with some inclination, and a short inclined groove 254 which forwardly inclines from the parallel guide surface 252.

The inclined surface 253 guides the front ends of the discs 101 and 106, which are inserted into the disc inserting opening 2, between the guide member 251 and the drive roller 9. The parallel guide surface 252 guides the discs 101 and 106 between the guide member 251 and the drive roller 9 with the disc surface being parallel to the disc transfer direction. The inclined groove 254 is for guiding the disc 106 of a diameter of eight centimeters toward the above-described disc plate 34, and the width $W_0$ thereof is somewhat greater than eight centimeters. The axis of the roller 9 is located directly below the intersecting point P of the parallel guide surface 252 and the inclined groove 254. A small-diameter disc 106 inserted into the disc inserting opening is guided with the disc surface being parallel to the direction of inserting the disc and is then lifted upwardly the tip front thereof by the drive roller 9 that rotates clockwise, drops in the inclined groove 254, and is guided toward the later described disc guide plate. The disc 101 of a large diameter does not drop in the inclined groove 254 of a width of eight centimeters since the disc 101 is 12 cm in diameter, but is carried along the parallel guide surface 252.

When the disc 106 of a small diameter is inserted into the disc inserting opening 2, the sensor 47 mounted to the front of a ceiling 3a detects the insertion of the disc 106 to cause a loading motor 10 to operate. At this time, if the small-diameter disc 106 deviates from the center of the disc insertion opening 2 when it is inserted into the disc insertion opening 2, the disc 106 abuts one of a pair of centering pins 18 and 19 and is positioned, as mentioned previously, in the middle of the disc insertion opening 2 by the centering mechanism 12. Then, the front end of the disc 106 is guided between the guide member 251 and the drive roller 9. The disc 106 is held in sandwiched relation between the guide member 251 and the drive roller 9 and is delivered by the drive roller 9 rotating clockwise onto the turntable 29. As shown in FIG. 13, the disc is eight centimeters in diameter and the drive roller is located with its rotational axis being directly below the intersecting point P of the parallel guide surface 252 and the inclined groove 254, therefore when the middle portion of a small-diameter disc 106 is guided past the intersecting point P, the front end of the small-diameter disc is tilted upwardly to be directed into the inclined groove 254, thereby switching the direction of transferring the disc toward the disc guide plate 34, to the right and upwardly in FIG. 13.

Since the CD player undergoes vibration while the vehicle is running, the disc guide plate 34 mounted to the clamper arm 34 is also subjected to vibration about pivot points 130 and 130. In which case, if the disc 106 is delivered straightly by the drive roller 9 along the guide surface 52, the disc 106 may not be properly arrested by the disc guiding recess 35 formed on the underside of the disc guide plate 34. The small-diameter disc 106 goes into the inclined groove 254 on the guide member 251 to thereby change its transfer direction to the right and upward direction in FIG. 13. The disc guide plate 34 mounted to the clamper arm 32 is located above the right side of the guide member 251 to reliably receive the disc 106 into the disc guiding recess 35 on the disc guide plate 34. When the disc 106 goes into the disc guiding recess 35, as shown in FIG. 6, the front end of the disc 106 pushes the detecting pin 41 through the depressing assist mechanism 37 which is on the other side of the hole 36 as mentioned before.

On the other hand, when the disc having a diameter of 12 cm is inserted into the disc inserting opening 2, it is held between the guide member 251 and the drive roller 9 in sandwiched relation, and is transferred straightly in the horizontal direction along the parallel guide surface 252 on the guide member 251 to the turntable 29. Since the disc 101 is 12 centimeters in diameter, as shown in FIG. 13, it does not go into the inclined groove 254 but is transferred horizontally along the guide surface 252 straightly to the turntable 29.

Since the disc 101 is 12 centimeters in diameter, when the large-diameter disc 101 delivered to the clamper arm 32 is in contact with the underside of the disc guide plate 34, it does not fit into the disc guiding recess 35 of a width narrower than the diameter of the disc 101, but is transferred over the disc guiding recess 35 and pushes up the disc guide plate 34. The disc 101 pushes the disc guide plate 34 against the urging force of a leaf spring 140 as shown in FIG. 9 and further repels the disc guide plate 34 for causing the disc guide plate 34 to swing about a pivot point 130 counterclockwise to directly push the detecting pin 41.

When the playback of the music recorded in the disc is over, the discs 101 or 106 placed on the turntable 29 is delivered by the drive roller 9 to the disc inserting opening 2. At this time, the drive roller 9 rotates counterclockwise in FIG. 13, the disc 101 or 106 is delivered horizontally in a direction opposite to the disc insertion direction along the guide surface 252 of the guide member 251 (to the left and upwardly in FIG. 13) by means of the drive roller, thereby discharging the disc 101 or 106 from the disc inserting opening 2.

As mentioned above, in the present invention, the clamper arm is provided with a disc guide plate for guiding the disc onto the turntable, a guide member which cooperates with the drive roller to guide the disc is disposed in opposing relation with the drive roller, and the guide member is formed with a guide surface substantially parallel to the disc delivery direction as well as an inclined groove by which the delivery direction of the disc is switched toward the disc guide plate when a small-diameter disc is to be delivered. Thus, the small-diameter disc can be reliably received into the disc guiding recess on the disc guide plate mounted to the clamper arm. The large-diameter disc does not go into the inclined groove but is delivered to the turntable along the parallel guide surface on the guide member. Thus, the disc, the small or large, can reliably be positioned at the clamp position of the turntable.

We claim:

1. A disc reproducing apparatus in which a disc is delivered from a disc insertion opening to a predetermined position within a player, a clamper arm that extends over a turntable for clamping the disc to fix the disc on the turntable, and then the turntable is rotated to reproduce information recorded in the disc, said apparatus comprising:

a disc guide plate being pivotally mounted to the clamper arm such that said disc guide plate engages and disengages the clamper arm; and a disc guiding recess into which a small-diameter disc can be fitted being provided to said disc guide plate;

wherein when the small-diameter disc is delivered, the small-diameter disc is fitted into said disc guiding recess to be aligned with a clamp position, and when a large-diameter disc is delivered, the large-diameter disc pushes said disc guide plate away to be aligned with said clamp position on the turntable.

2. A disc reproducing apparatus in which a disc is inserted through a disc insertion opening to abut a drive roller and is then delivered by means of the drive roller to a clamp position of a player, a clamper arm extending over the turntable to fix the disc on the turntable, and the turntable is rotated to reproduce information recorded in the disc, said apparatus comprising:

a disc guide plate for guiding a small-diameter disc to the clamp position on the turntable being pivotally mounted on the underside of the clamper arm;

a guide member being opposed to said drive roller, the guide member cooperating with said drive roller to guide and deliver the disc;

a parallel guide surface being formed on said guide member, said surface being substantially parallel to the disc delivery direction; and an inclined groove being formed continuously integral with the parallel guide surface, said inclined groove having a length through which said small-diameter disc can pass in a disc insertion direction but through which a large-diameter disc cannot pass, said inclined groove orienting said small-diameter disc to said disc guide plate.

3. A disc reproducing apparatus according to claim 2, wherein said drive roller has a rotational axis directly below an intersection of said parallel guide surface and said inclined groove.

* * * * *